United States Patent
Lu

(10) Patent No.: US 7,579,107 B2
(45) Date of Patent: Aug. 25, 2009

(54) PORTABLE ELECTRONIC DEVICE EMPLOYING BATTERY

(75) Inventor: Yu-Lun Lu, Tainan Hsien (TW)

(73) Assignee: Chi Mei Communication Systems, Inc., Tu-Cheng, Taipei County (TW)

( * ) Notice: Subject to any disclaimer, the term of this patent is extended or adjusted under 35 U.S.C. 154(b) by 45 days.

(21) Appl. No.: 11/777,097

(22) Filed: Jul. 12, 2007

(65) Prior Publication Data

US 2008/0193829 A1 Aug. 14, 2008

(30) Foreign Application Priority Data

Feb. 9, 2007 (CN) .................. 2007 1 0073266

(51) Int. Cl.
*H01M 2/10* (2006.01)
*H01M 10/00* (2006.01)

(52) U.S. Cl. ............... 429/97; 429/96; 429/100; 429/122; 429/163

(58) Field of Classification Search ............ 429/96, 429/97, 100, 122, 163
See application file for complete search history.

(56) References Cited

U.S. PATENT DOCUMENTS 3,147,151 A * 9/1964 Toce .................. 429/120
2004/0253507 A1 * 12/2004 Kohri et al. ............ 429/100

* cited by examiner

*Primary Examiner*—Dah-Wei D Yuan
*Assistant Examiner*—Katherine Turner
(74) *Attorney, Agent, or Firm*—Steven M. Reiss

(57) ABSTRACT

A portable electronic device (100) includes a main body (10), a cover (20), and a battery (30). The cover has at least one claw (252), and the cover is mounted to the main body by the at least one claw. The battery has at least one protrusion (35). Each protrusion is configured for engaging with a corresponding claw in such a manner that when the battery is positioned in a "tool" mode (i.e., as opposed to a "use"/ battery-power mode) is pressed towards the cover, a given protrusion pushes a respective claw away from the main body to allow the cover to be separated from the main body.

11 Claims, 4 Drawing Sheets

PORTABLE ELECTRONIC DEVICE EMPLOYING BATTERY

BACKGROUND OF THE INVENTION

1. Field of the Invention

The present invention relates to batteries and portable electronic devices and, particularly, to a battery configured (i.e., structured and arranged) for removing a cover of a portable electronic device from a main body of the portable electronic device.

2. Description of Related Art

Nowadays, portable electronic devices such as mobile phones and PDAs (personal digital assistants) are in widespread use around the world. There is more and more demand for higher quality and serviceability of these portable electronic devices. Many portable electronic devices are provided with removable covers that can be changed over for new, more aesthetically pleasing covers, when so desired by users.

Removable covers are most commonly provided for mobile phones. A user may, from time to time, want to remove an old cover from a main body of the mobile phone and install a new fashionable cover on the main body instead. The new cover must be able to be attached firmly and securely.

Currently, removable covers of portable electronic devices are commonly fixed on the main bodies by means of structures integrated with the covers themselves. A related mobile phone includes a main body and a removable cover. A top of the removable cover is bent to define a holding portion, and a hook protrudes from an inner surface of the holding portion. The removable cover has a peripheral flange. A bottom of the removable cover has two projections, and opposite sides of the removable cover have a plurality of detents. The projections and the detents protrude from the flange. Corresponding to the structure of the removable cover, the main body has an engaging surface and defines a notch, two grooves, and a plurality of slits. The notch is located at a top of the engaging surface. The grooves are located at a bottom of the engaging surface. The slits are located at two opposite sides of the engaging surface. In assembly, the projections are first inserted into the grooves and retained therein. The hook is then inserted into the notch, with the detents being received in the slits. The hook is firmly engaged in the notch, and the detents are securely engaged in the slits. Thus, the removable cover is firmly fixed to the main body. In disassembly, the hook is first disengaged from the notch, with the detents being removed from the slits. The projections are then pulled out from the grooves. The removable cover is thus fully detached from the main body.

It is important for the removable cover to not only be firmly retained in the main body, but also to be easily removed when needed. Generally, a good deal of force needs to be exerted on the removable cover for it to be detached. The removable cover is easily damaged if excessive force is applied, both in the process of detaching the removable cover and also in attaching the removable cover.

A new a portable electronic device with a removable cover is desired in order to overcome the above-described problems.

SUMMARY

In one aspect thereof, a battery for use in a portable electronic device, includes a body and a protrusion formed on the body. The body is substantially rectangular in shape and has two opposite sidewalls and a surface extending between the two opposite sidewalls. The protrusion extends from one of the sidewalls and is adjacent to the surface.

In another aspect thereof, a portable electronic device includes a main body, a cover, and a battery. The cover has a claw, and the cover is mounted to the main body by the claw. The battery has a protrusion. The protrusion is configured for engaging with the claw in such a manner that when the battery is pressed towards the cover, the protrusion pushes the claw outwardly, away from the main body, to allow the cover to separate from the main body.

Other advantages and novel features of the embodiments will become more apparent from the following detailed description thereof, when taken in conjunction with the accompanying drawings.

BRIEF DESCRIPTION OF THE DRAWINGS

Many aspects of the present portable electronic device can be better understood with reference to the following drawings. The components in the drawings are not necessarily drawn to scale, the emphasis instead being placed upon clearly illustrating the principles of the present portable electronic device and its potential applications. Moreover, in the drawings, like reference numerals designate corresponding parts throughout the several views.

DETAILED DESCRIPTION OF THE EMBODIMENTS

The present battery is particularly suitable for portable electronic devices, such as mobile phones, PDAs, and the like, but could find other applications in which a battery and related cover are employed.

Figure 1:
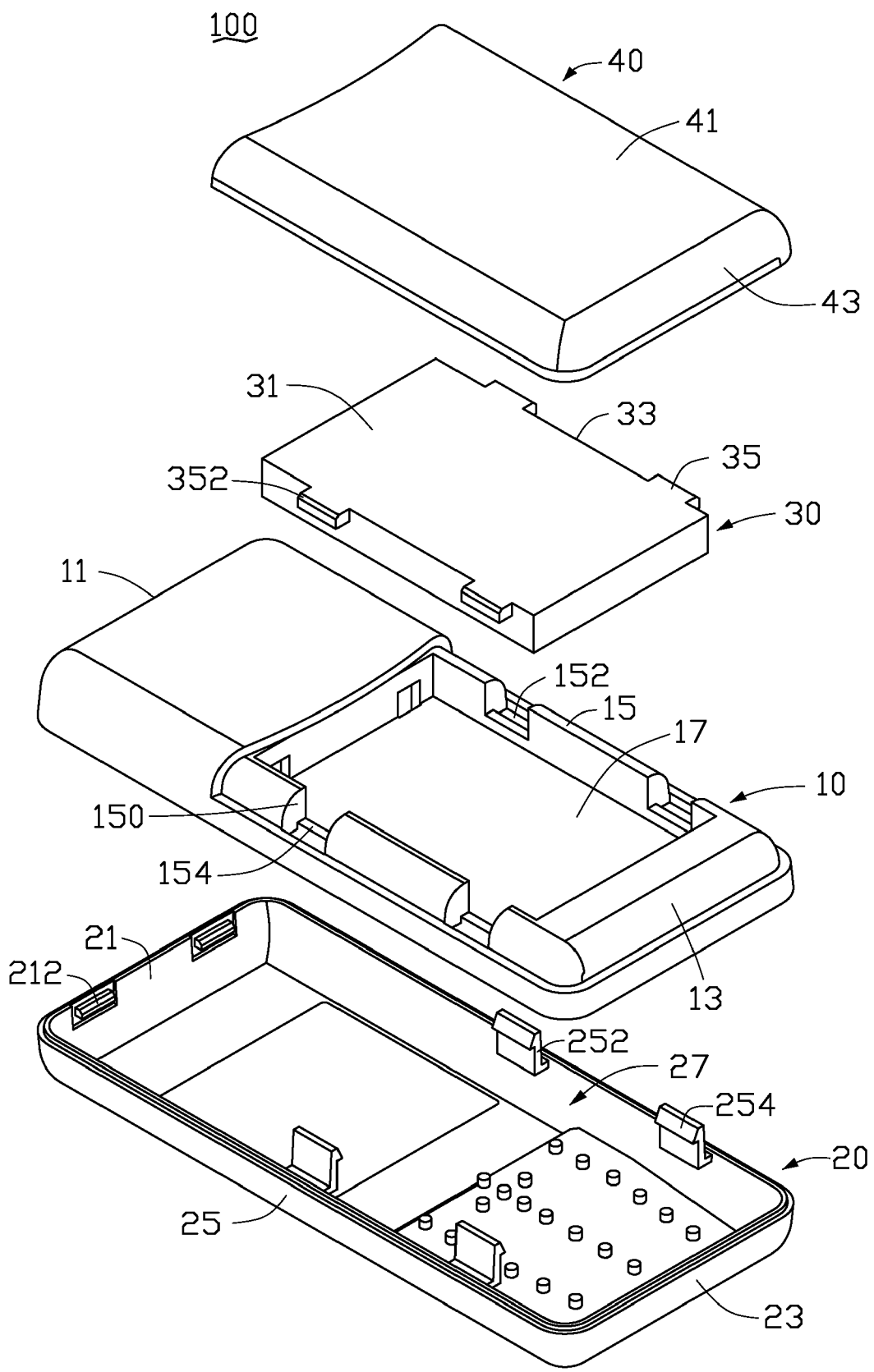
FIG. 1 is an exploded, isometric view of a portable electronic device, in accordance with a present embodiment.

Referring now to the drawings in detail, FIG 1 shows a portable electronic device 100. The portable electronic device 100 includes a main body 10, a cover 20, a battery 30, and a battery cover 40. The cover 20 is mounted to one side of the main body 10. The battery 30 is mounted to an opposite side of the main body 10 and is covered by the battery cover 40. The battery cover 40 includes a body 41 with an end portion 43.

The main body 10 is a substantially rectangular board in shape and has a top portion 11, a bottom portion 13 opposite to the top portion 11, and two opposite/opposing sidewalls 15. The top portion 11, the bottom portion 13, and the two opposite sidewalls 15 cooperate to define a cavity 17 configured (i.e., structured and arranged) for receiving the battery 30 therein. The body 41 of the battery cover 40 is configured for positioning the battery 30 in the main body 10 with the end portion 43 mounted on the bottom portion 13. The top portion 11 defines two grooves (not shown) in one end thereof. Each of the sidewalls 15 defines respective two cutouts 150 in an upper portion thereof. A lower portion of each sidewall 15 defines corresponding two through holes 152 therethrough and respective two beams 154 (i.e., a given hole 152 being adjacent to a corresponding beam 154). Each cutout 150 communicates with one corresponding through hole 152.

The cover 20 is a substantially rectangular board in shape (the primary board portion not being specifically labeled) and has a top wall 21, a bottom wall 23 opposite to the top wall 21, and two opposite sidewalls 25, extending around the main board portion thereof. The top wall 21, the bottom wall 23, and the two opposite sidewalls 25 cooperate to define a chamber 27 configured for receiving one or more components, such as a motherboard, therein. Two hooks 212 are formed on an inner surface of the top wall 21 and are configured for being receivable in their respective grooves of the main body 10. Two claws 252 are formed on an inner surface of each of the sidewalls 25. A wedge 254 is formed on a distal end of each claw 252. The wedge 254 of one sidewall 25 faces a corresponding wedge 254 of the other sidewall 25, with each wedge 254 being, in part, downwardly and outwardly angled away from the sidewall 25 corresponding thereto. Each claw 252 is configured for traveling through one corresponding through hole 152 of the main body 10, and each wedge 254 is configured for resisting (i.e., latching against) one corresponding beam 154 of the main body 10.

The battery 30 includes a body. The body is a substantially rectangular board in shape and has two opposite sidewalls 33 and a surface 31 extending between the two opposite sidewalls 33. The surface 31, as a main surface of the battery body, is rectangular in shape. Two respective protrusions 35 extend perpendicularly and directly from each sidewall 33 and adjacent and essentially parallel to the surface 31. Each protrusion 35 is configured for being receivable in a corresponding cutout 150 of the main body 10. An upper distal end of each protrusion 35 has an inclined plane 352. Each inclined plane 352 is configured for engaging with a corresponding wedge 254 of the claw 252 of the cover 20. In particular, when the body of the battery 30 is flipped over (i.e., the surface 31 now facing the cover 20) and then pushed downwardly toward the cover 20, a given inclined plane 352 biases against a respective wedge 254 in a manner that concurrently outwardly displaces the related claw 252 away from the battery 30 and the rest of the cover 20.

Figure 2:
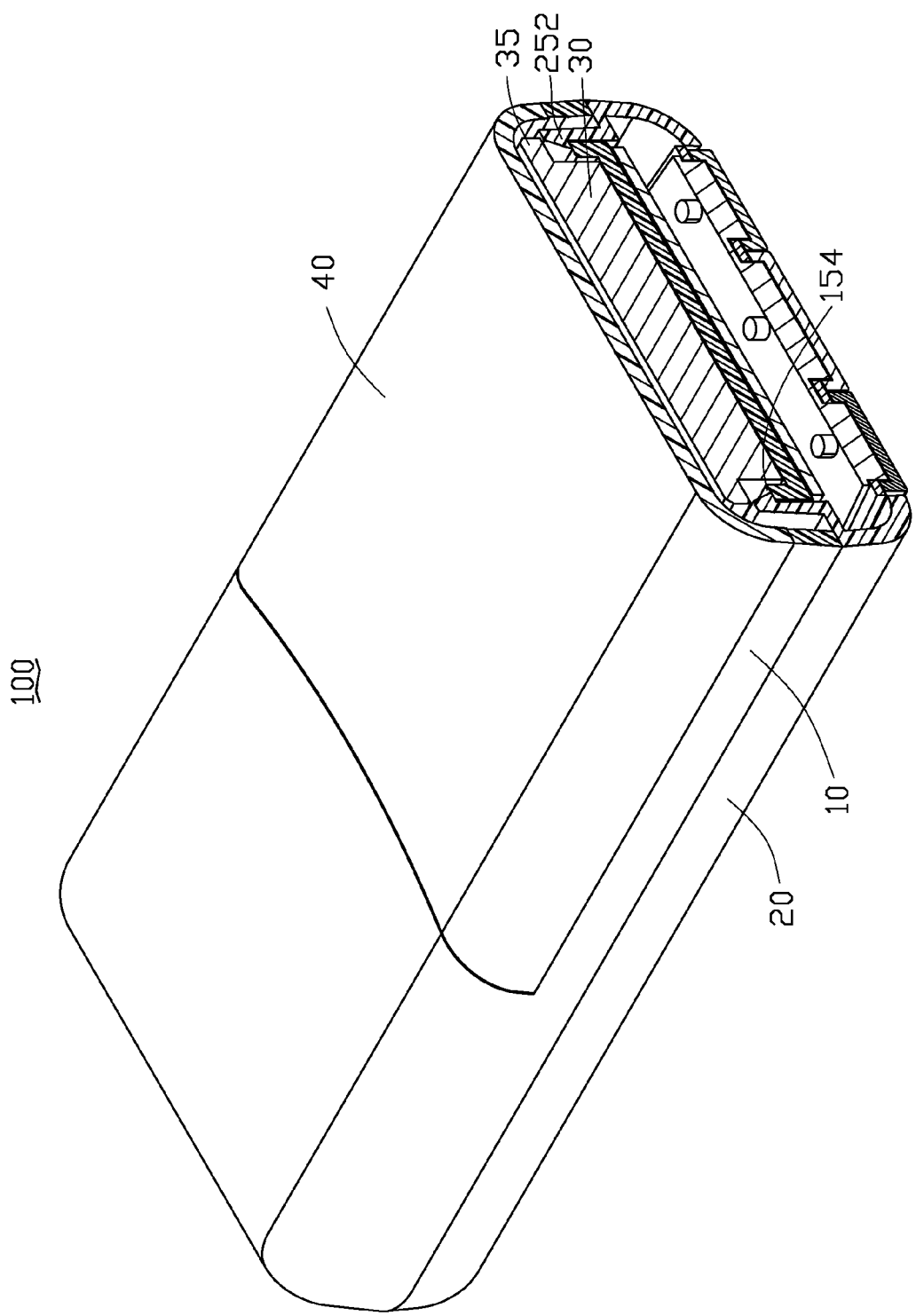
FIG. 2 is an assembled, enlarged, partially cut-away view of the portable electronic device shown in FIG. 1.

In assembly, each hook 212 of the cover 20 is inserted into a corresponding groove of the main body 10. Each claw 252 of the cover 20 is inserted through a corresponding through hole 1 52 until a respective wedge 254 resists/abuts a corresponding beam 154 of the main body 10. Thus, the cover 20 is mounted to one side of the main body 10. The battery 30 is received in the cavity 17 of the main body 10. Each protrusion 35 is received in a corresponding cutout 150 of the main body 10 and is located on a corresponding wedge 254, in contact therewith. The battery cover 40 is mounted to the main body 10 to position/hold the battery 30 in place, in its "use" position, so as to be able to power the operation of the portable electronic device 100. Thus, the portable electronic device 100 is assembled, as represented in FIG. 2.

Figure 3:
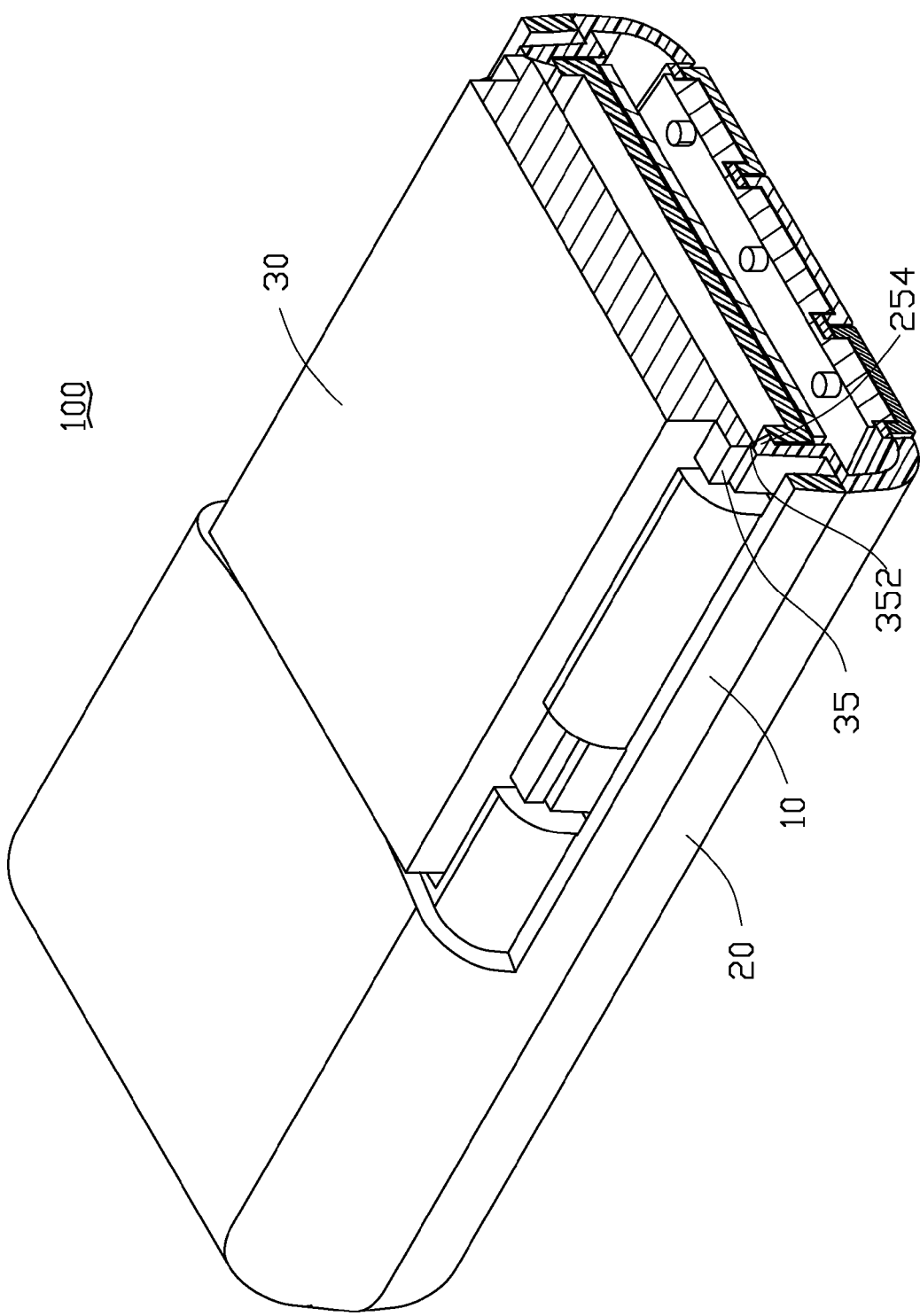
FIG. 3 is an enlarged, partially cut-away view of the portable electronic device of the embodiment shown in FIGS. 1 and 2, shown in one operational state.
Figure 4:
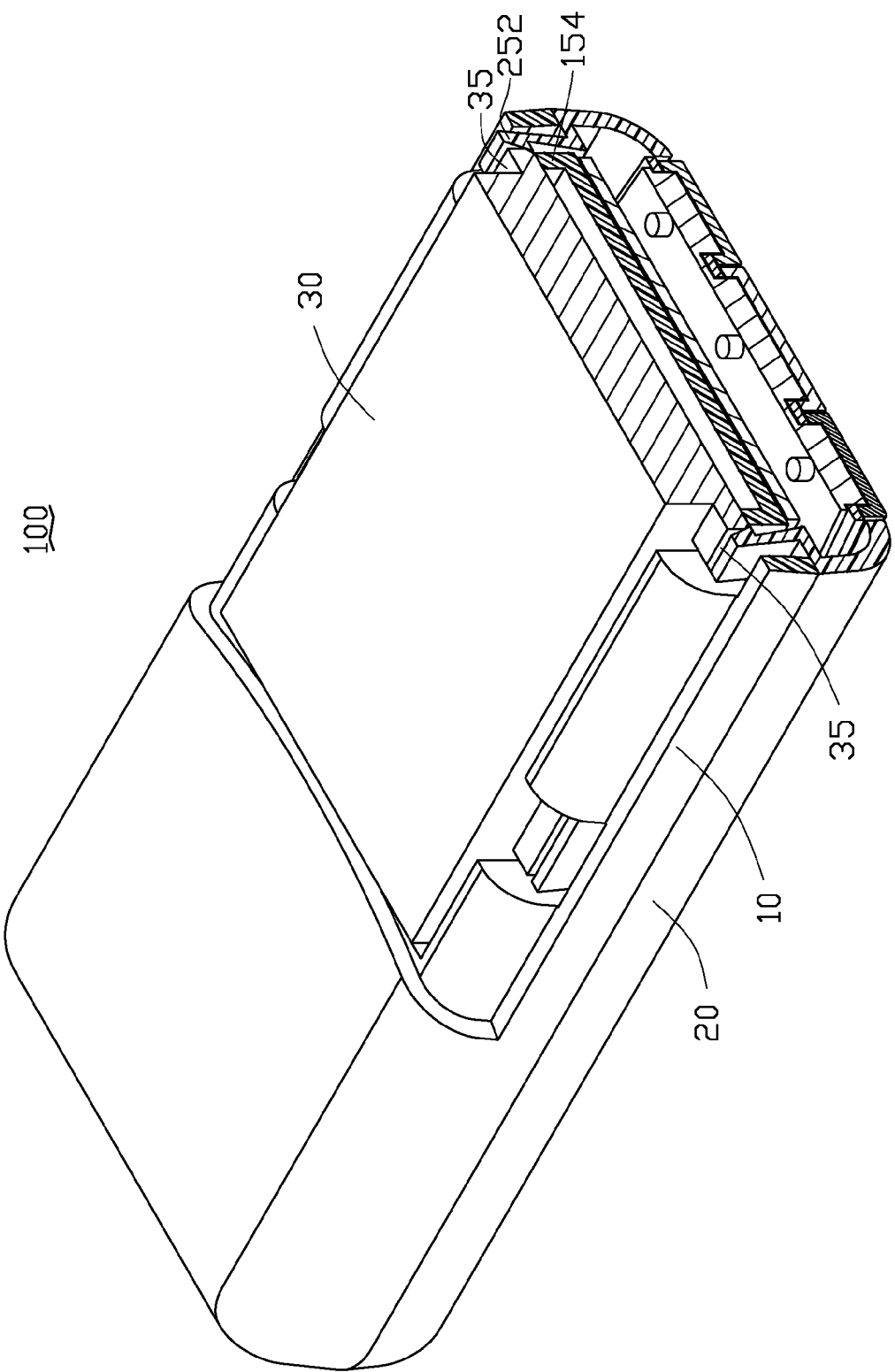
FIG. 4 is an enlarged, partially cut-away view of the portable electronic device of the embodiment shown in FIGS. 1 and 2, shown in another operational state.

Referring to FIGS. 3-4, when removing the cover 20 from the main body 10, the battery cover 40 is first removed. Then, the battery 30 is reversely placed in a "tool" mode position (i.e., removed, flipped over, and reinserted to make the surface 31 face the cover 20) in the cavity 17 of the main body 10. Now, each inclined plane 352 of the protrusion 35 of the battery 30 abuts against a corresponding wedge 254 of the claw 252 of the cover 20. The battery 30 is pushed towards the cover 20, and each protrusion 35 moves the respective wedge 254 away from the beam 154, due to the engagement of a given inclined plane 352 and the corresponding wedge 254. When the wedge 254 is fully pushed away from the beam 154, the cover 20 can be removed away from the main body 10 by manually pulling the claws 252 out through the corresponding through holes 152. Essentially, the battery 30, as configured, doubles as tool for removal of the cover 20.

It is to be understood that the number of the protrusions 35, cutouts 150, claws 252, and through holes 152 may be one, two, three, or more. It is to be understood that the number of protrusions 35 cannot exceed the number of cutouts 150, and, likewise, the number of claws 252 cannot be greater than the number of through holes 152 and/or cutouts 150.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A portable electronic device comprising:
    a main body;
    a cover having a claw, the cover being mounted to the main body by the claw; and
    a battery having a protrusion, the protrusion being configured for selectably engaging with the claw in such a manner that, when the battery is pressed towards the cover, the protrusion pushes the claw away from the main body in a manner to allow the cover to separate from the main body.

2. The portable electronic device as claimed in claim 1, wherein the main body has a sidewall, the sidewall defines a through hole therein and an adjacent beam, and the claw of the cover travels through the through hole and then latches against the beam.

3. The portable electronic device as claimed in claim 2, wherein the claw of the cover has a wedge formed on a distal end thereof, and the wedge resists the beam upon latching of the claw.

4. The portable electronic device as claimed in claim 3, wherein the protrusion of the battery has an inclined plane formed at a distal end thereof, and the inclined plane is configured for selectably engaging with the wedge of the claw to aid pushing thereof away from the main body.

5. The portable electronic device as claimed in claim 2, wherein the sidewall of the main body defines a cutout communicating with the through hole, and the protrusion of the battery is configured for being receivable in the cutout and for thereby mounting the battery to the main body.

6. The portable electronic device as claimed in claim 5, further comprising a battery cover, wherein battery cover is mounted to the main body for positioning the battery.

7. The portable electronic device as claimed in claim 1, wherein the battery includes a body, the body is substantially rectangular in shape, and the body has two opposite sidewalls and a surface extending between the two opposite sidewalls.

8. The portable electronic device as claimed in claim 7, wherein the protrusion extends perpendicularly from one of the sidewalls and is adjacent and essentially parallel to the surface.

9. The portable electronic device as claimed in claim 7, wherein the battery further includes another protrusion, and the two respective protrusions are symmetrically formed on the two sidewalls.

10. The portable electronic device as claimed in claim 9, wherein the cover further includes another claw and another sidewall, the two respective claws are symmetrically formed on the two sidewalls.

11. The portable electronic device as claimed in claim 7, wherein the battery further includes a plurality of protrusions, the cover further includes a plurality of claws, and each protrusion corresponds to a respective claw.

\* \* \* \* \*